(12) United States Patent
Atsushi et al.

(10) Patent No.: US 10,005,439 B2
(45) Date of Patent: Jun. 26, 2018

(54) ABS HYDRAULIC UNIT

(71) Applicant: Robert Bosch GmbH, Stuttgart (DE)

(72) Inventors: Hiroaki Atsushi, Kanagawa (JP); Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/311,241

(22) PCT Filed: Apr. 17, 2015

(86) PCT No.: PCT/JP2015/061813
§ 371 (c)(1),
(2) Date: Nov. 15, 2016

(87) PCT Pub. No.: WO2015/174210
PCT Pub. Date: Nov. 19, 2015

(65) Prior Publication Data
US 2017/0080911 A1    Mar. 23, 2017

(30) Foreign Application Priority Data

May 16, 2014 (JP) .................................. 2014-102054

(51) Int. Cl.
*B60T 8/34* (2006.01)
*B60T 8/17* (2006.01)
*B60T 8/36* (2006.01)

(52) U.S. Cl.
CPC .............. *B60T 8/34* (2013.01); *B60T 8/1706* (2013.01); *B60T 8/368* (2013.01); *B60T 2270/10* (2013.01)

(58) Field of Classification Search
CPC .......... B60T 8/34; B60T 8/1706; B60T 8/368; B60T 2270/10

(Continued)

(56) References Cited

U.S. PATENT DOCUMENTS 5,407,260 A * 4/1995 Isshiki ................ B60R 16/0239
303/113.1
5,529,389 A * 6/1996 Sekiguchi ............... B60T 8/368
137/884

(Continued)

FOREIGN PATENT DOCUMENTS

DE          19518518 C1    8/1996
DE     102007001733 A1    7/2008

(Continued)

OTHER PUBLICATIONS

International Search Report for Application No. PCT/JP2015/061813 dated Jul. 7, 2015 (English Translation, 2 pages).

*Primary Examiner* — Thomas J Williams
*Assistant Examiner* — Mariano Sy
(74) *Attorney, Agent, or Firm* — Michael Best & Friedrich LLP

(57) ABSTRACT

Provided is an ABS hydraulic unit where it is unnecessary to change a size of a control circuit board corresponding to a size of a block. An ABS hydraulic unit for performing an antilock brake control of a hydraulic brake includes: a pump and a valve mounted in a hydraulic circuit for making the hydraulic brake perform braking; a motor for operating the pump; a block into which the pump, the valve and the motor are assembled; and a control circuit board for controlling the motor and the valve, wherein the block has a first surface into which. the motor and the valve are assembled, and a second surface which intersects with the first surface, and the control circuit board is arranged such that the control circuit board extends along the second surface and the valve is positioned between the control circuit board and the motor, the control circuit board being electrically connected with the motor and the valve through a wire extending along the first surface.

19 Claims, 7 Drawing Sheets

(58) Field of Classification Search
USPC ..... 303/10, 11, 116.4, 119.1–119.3, DIG. 10
See application file for complete search history.

(56) References Cited

U.S. PATENT DOCUMENTS

| | | | | |
|---|---|---|---|---|
| 5,658,056 | A | * | 8/1997 | Rischen .................. B60T 8/368 303/113.1 |
| 5,695,259 | A | * | 12/1997 | Isshiki ................ B60R 16/0239 303/119.2 |
| 5,758,931 | A | * | 6/1998 | Hio .................... B60R 16/0238 303/113.1 |
| 5,769,508 | A | * | 6/1998 | Gilles .................... B60T 8/368 303/116.4 |
| 6,679,568 | B1 | * | 1/2004 | Schafer .................. B60T 8/368 303/119.3 |
| 2002/0190572 | A1 | | 12/2002 | Nakazawa |
| 2007/0090689 | A1 | | 4/2007 | Kempf |
| 2015/0191161 | A1 | * | 7/2015 | Sagayama ............. B62K 23/06 303/137 |
| 2017/0080910 | A1 | * | 3/2017 | Sagayama ............. B60T 8/368 |
| 2017/0174195 | A1 | * | 6/2017 | Sagayama ............. B60T 8/4022 |

FOREIGN PATENT DOCUMENTS

| | | | | |
|---|---|---|---|---|
| JP | 5139273 | | 6/1993 | |
| JP | 6239217 | | 8/1994 | |
| JP | 1059153 | | 3/1998 | |
| JP | 2002370635 | | 12/2002 | |
| JP | 2006168664 | A | 6/2006 | |
| JP | 2007168456 | A | 7/2007 | |
| JP | 2014069663 | | 4/2014 | |
| JP | 2014069663 | A * | 4/2014 | ............. B60T 8/368 |
| WO | 2013127969 | A1 | 9/2013 | |

\* cited by examiner

ABS HYDRAULIC UNIT

BACKGROUND OF THE INVENTION

The present invention relates to an ABS hydraulic unit for performing an antilock brake control of a hydraulic brake.

Conventionally, there has been known an ABS hydraulic unit for performing an antilock brake control of a hydraulic brake (see JP-A-2002-370635, for example). In this type of ABS hydraulic unit, pumps, valves and the like are assembled into a block in which a pipe passage through which a brake fluid for a hydraulic circuit flows is formed. Accordingly, a control circuit board for controlling these pumps, valves and the like is arranged in a state where the control circuit board covers the valves and the like so as to sandwich the valves and the like between the control circuit board and the block, and is electrically connected to these valves.

SUMMARY OF THE INVENTION

However, in the above-mentioned ABS hydraulic unit pertaining to the related art, the number of valves is changed corresponding to the number of hydraulic circuits which the ABS hydraulic unit has. For example, an ABS hydraulic unit which can perform an antilock brake control with respect to both a front wheel and a rear wheel has twice as many valves as an ABS hydraulic unit which can perform an antilock brake control only with respect to a front wheel. Due to the above, a size of a block into which valves are assembled is increased corresponding to the number of valves and hence, it is necessary to increase a size of a control circuit board which is arranged in a state where the control circuit board covers the valves and the like corresponding to the increase of the size of the block.

It is an object of the invention to provide an ABS hydraulic unit which can overcome the above-mentioned drawbacks that the related art has where it is unnecessary for the ABS hydraulic unit to change a size of a control circuit board corresponding to a size of a block.

The invention is directed to an ABS hydraulic unit for performing an antilock brake control of a hydraulic brake which includes: a pump and a valve mounted in a hydraulic circuit for making the hydraulic brake perform braking; a motor for operating the pump; a block into which the pump, the valve and the motor are assembled; and a control circuit board for controlling the motor and the valve, wherein the block has a first surface into which the motor and the valve are assembled, and a second surface which intersects with the first surface, and the control circuit board is arranged such that the control circuit board extends along the second surface and the valve is positioned between the control circuit board and the motor, the control circuit board being electrically connected with the motor and the valve through a wire extending along the first surface.

In this case, the block may have a second hydraulic circuit which differs from the hydraulic circuit, and a second valve mounted in the second hydraulic circuit may be assembled into the first surface such that the motor is positioned between the second valve and the control circuit board. The wire may be provided in the form of a plurality of combined wires, and the wire is used in common by the motor and the valve. The wire may be provided in the form of a plurality of combined wires, and the wire may be used in common by the valve and the second valve. The wire may be a flexible wire. The motor may be configured to operate the pump by way of a planetary gear mechanism.

According to the invention, it is possible to realize an ABS hydraulic unit where it is unnecessary to change a size of a control circuit board corresponding to a size of a block.

DETAILED DESCRIPTION

Hereinafter, preferred embodiments of the invention are explained with reference to drawings.

Figure 1:
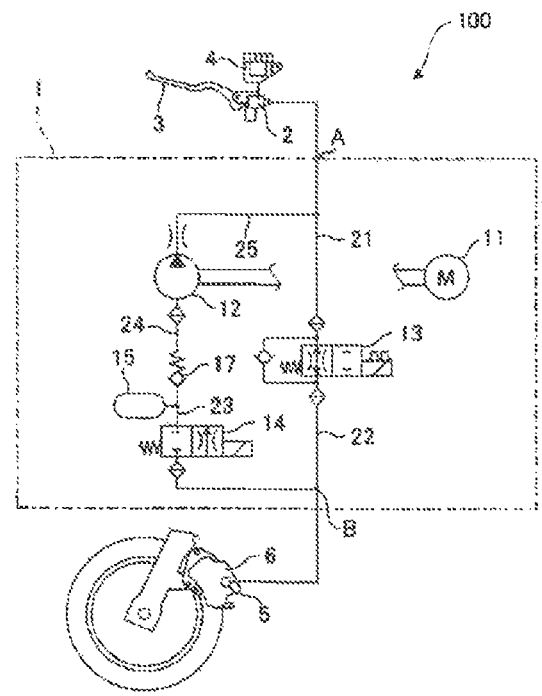
FIG. 1 is a circuit diagram showing a hydraulic circuit of an ABS hydraulic unit of one channel according to this embodiment.

FIG. 1 is a circuit diagram showing a hydraulic circuit of an ABS hydraulic unit of one channel which can perform an antilock brake control only with respect to a front wheel. An ABS hydraulic unit 100 of one channel has a hydraulic circuit 1 of only one system, and is mounted on a motorcycle so as to perform an ABS (antilock braking system) control only with respect to the front wheel. Hereinafter, the hydraulic circuit 1 which can perform an ABS control with respect to the front wheel is explained.

The hydraulic circuit 1 is filled with a brake fluid, and is connected to a master cylinder 2 at a connection end A thereof. A brake lever 3 is mounted on the master cylinder 2, and the master cylinder 2 is connected to a reservoir 4. Due to such a constitution, when a rider manipulates the brake lever 3 so as to make a brake of the front wheel perform braking, the master cylinder 2 discharges a brake fluid accumulated in the reservoir 4 to the hydraulic circuit 1.

On the other hand, the hydraulic circuit 1 is connected to a wheel cylinder 5 at a connection end B thereof. The wheel cylinder 5 is mounted in a brake caliper 6 of the front wheel. The brake caliper 6 is operated along with the increase of a fluid pressure in the wheel cylinder 5 and applies a braking force to the front wheel.

The hydraulic circuit 1 connected between the master cylinder 2 and the wheel cylinder 5 includes: a motor 11; a pump 12; an inlet valve (valve) 13; an outlet valve (valve) 14; and an accumulator 15.

The inlet valve 13 is an electromagnetic valve provided with a solenoid. The inlet valve 13 is connected to the connection end A through a first pipe 21, and is also connected to the connection end B and the outlet valve 14 through a second pipe 22. The second pipe 22 is bifurcated in the middle thereof and hence, the second pipe 22 is connected to the inlet valve 13, the connection end B, and the outlet valve 14. The inlet valve 13 is connected to the first pipe 21 and the second pipe 22 by way of a filter respectively. A check valve is connected to the inlet valve 13 in parallel between two filters. The check valve does not allow the flow of a brake fluid from the first pipe 21 into the second pipe 22 but allows the flow of a brake fluid from the second pipe 22 into the first pipe 21 even when the inlet valve 13 is closed. The inlet valve 13 is provided for controlling the flow of a brake fluid from the first pipe 21 to the second pipe 22 due to opening or closing of the inlet valve 13.

The outlet valve 14 is an electromagnetic valve provided with a solenoid. The outlet valve 14 is connected to the inlet valve 13 and the connection end B through the second pipe 22, and is connected to the accumulator 15 through a third pipe 23. The outlet valve 14 is connected to the second pipe 22 by way of a filter. The outlet valve 14 is provided for controlling the flow of a brake fluid from the second pipe 22 into the third pipe 23 due to opening or closing of the outlet valve 14.

The accumulator 15 is connected to the outlet valve 14 through the third pipe 23, and is connected to a suction side of the pump 12 through a fourth pipe 24. The accumulator 15 is connected to the fourth pipe 24 by way of a check valve 17. Due to the provision of the check valve 17, when a fluid pressure of a brake fluid exceeds a predetermined pressure, it is always the case that the brake fluid can flow from the accumulator 15 into the fourth pipe 24 but cannot flow from the fourth pipe 24 into the accumulator 15. The accumulator 15 is provided for accumulating a brake fluid which flows into the accumulator 15 from the third pipe 23, and discharges an accumulated brake fluid into the fourth pipe 24.

The pump 12 is connected to the accumulator 15 through the fourth pipe 24, and is connected to the first pipe 21 through a fifth pipe 25. The pump 12 is connected to the fourth pipe 24 by way of a filter, and is connected to the fifth pipe 25 by way of a throttle. The pump 12 is operated when the motor 11 which is a DC motor is driven, and sucks a brake fluid from the fourth pipe 24 disposed at a suction side, and discharges the brake fluid sucked into the fifth pipe 25 disposed at a discharge side.

Figure 2:
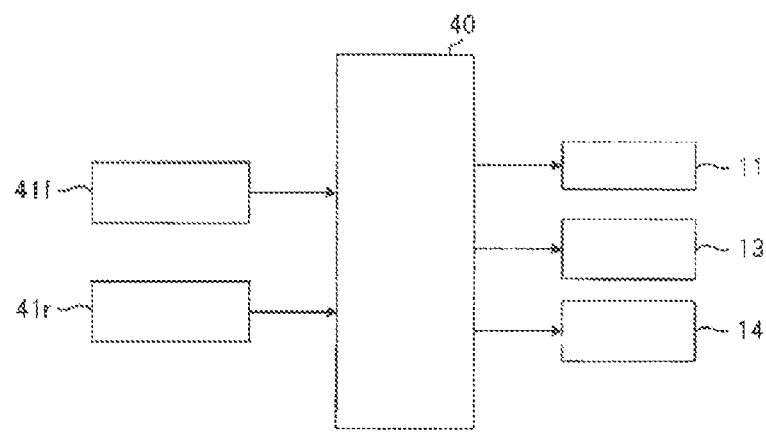
FIG. 2 is a block diagram showing the functional constitution formed by an ECU.

FIG. 2 is a block diagram showing the functional constitution formed by the ECU.

The ECU 40 controls the driving of the motor 11, an opening state or a closing state of the inlet valve 13, an opening state or a closing state of the outlet valve 14 and the like based on a rotational speed signal which the ECU 40 receives from a speed sensor 41f which detects a rotational speed of the front wheel and outputs a rotational speed signal corresponding to the detected rotational speed, and a rotational speed signal which the ECU 40 receives from a speed sensor 41r which detects a rotational speed of the rear wheel and outputs a rotational speed signal corresponding to the detected rotational speed.

In a usual braking state, the ECU 40 stops the driving of the motor 11 so that the inlet valve 13 is held in an open state and the outlet valve 14 is held in a closed state. Due to such an operation, when a rider manipulates the brake lever 3 so that a pressure of a brake fluid is increased by the master cylinder 2 (see FIG. 1), the increase of the pressure of the brake fluid is transmitted to the wheel cylinder 5 (see FIG. 1) through the first pipe 21 (see FIG. 1), the inlet valve 13, and the second pipe 22(see FIG. 1). Accordingly, the brake caliper 6 (see FIG. 1) is operated in an interlocking manner with the manipulation of the brake lever 3 (see FIG. 1) by the rider so that a braking force is applied to the front wheel.

At the time of performing braking where a braking force is generated by the brake caliper 6, the ECU 40 repeatedly determines whether or not the front wheel is in a locked state, that is, whether or not the front wheel excessively slips on a road surface based on rotational speed signals acquired from the speed sensors 41f, 41r. When the ECU 40 determines that the front wheel is in a locked state, the ECU 40 closes the inlet valve 13, opens the outlet valve 14, and operates the pump 12 by driving the motor 11 thus performing a control so as to lower a fluid pressure of a brake fluid transmitted to the wheel cylinder 5 by opening or closing the inlet valve 13 and the outlet valve 14. Due to such an operation, the ECU 40 controls a braking force of the brake caliper 6 by an antilock brake control thus releasing a locked state of the front wheel.

Figure 3:
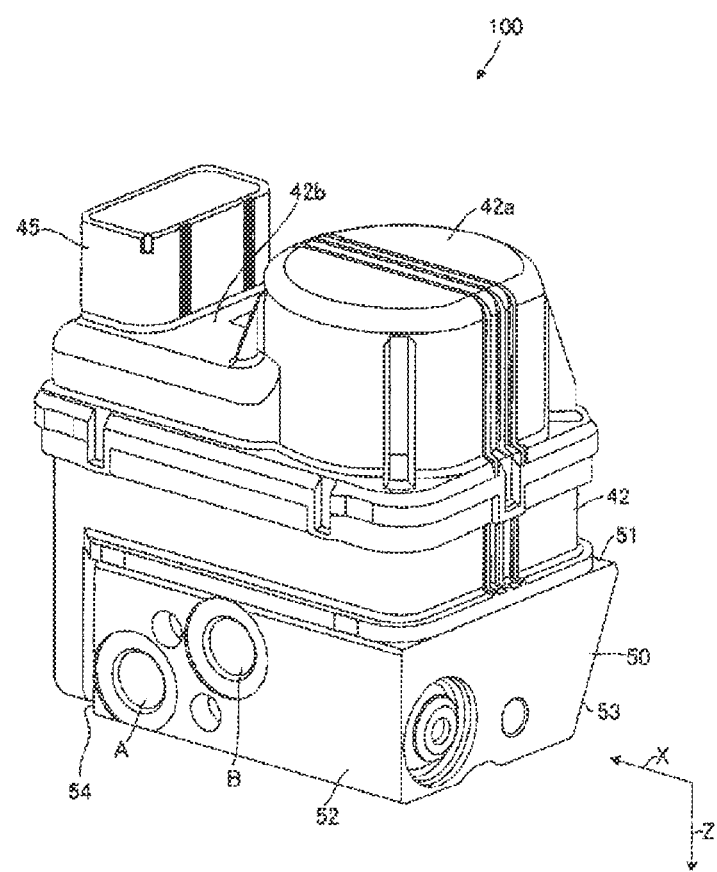
FIG. 3 is a perspective view showing the ABS hydraulic unit of one channel.
Figure 4:
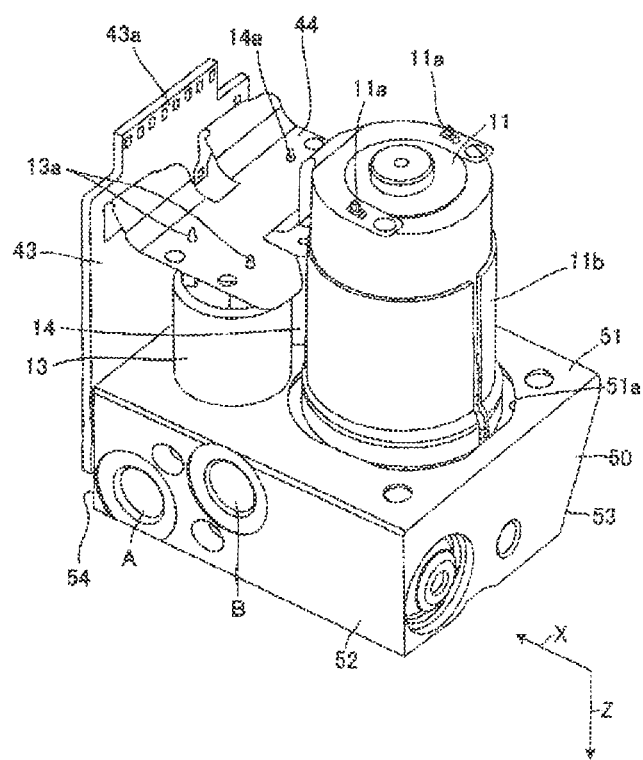
FIG. 4 is a perspective view showing the ABS hydraulic unit of one channel in a state where a housing is removed from the ABS hydraulic unit.
Figure 5:
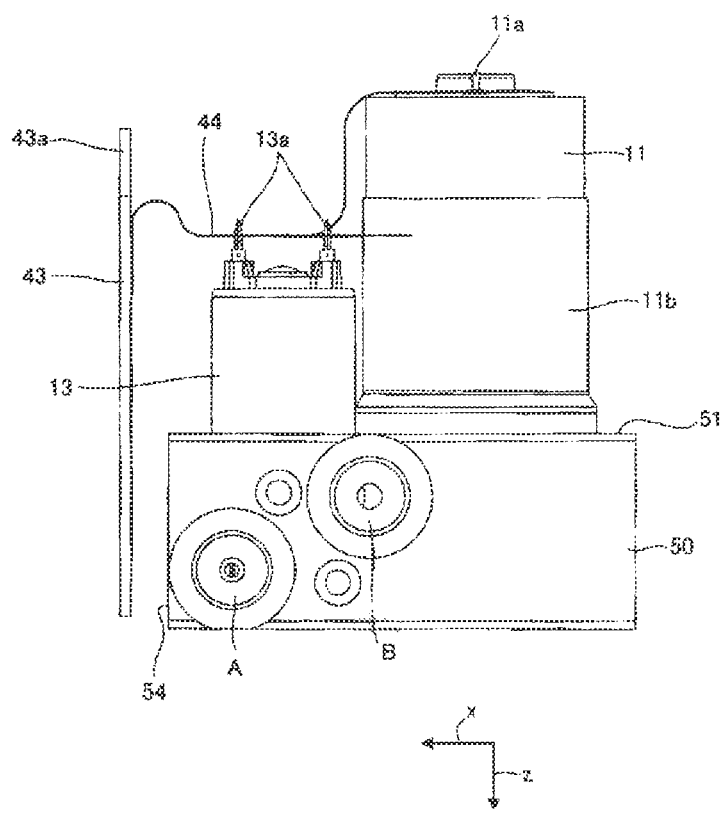
FIG. 5 is a side view showing the ABS hydraulic unit of one channel in a state where the housing is removed from the ABS hydraulic unit.
Figure 6:
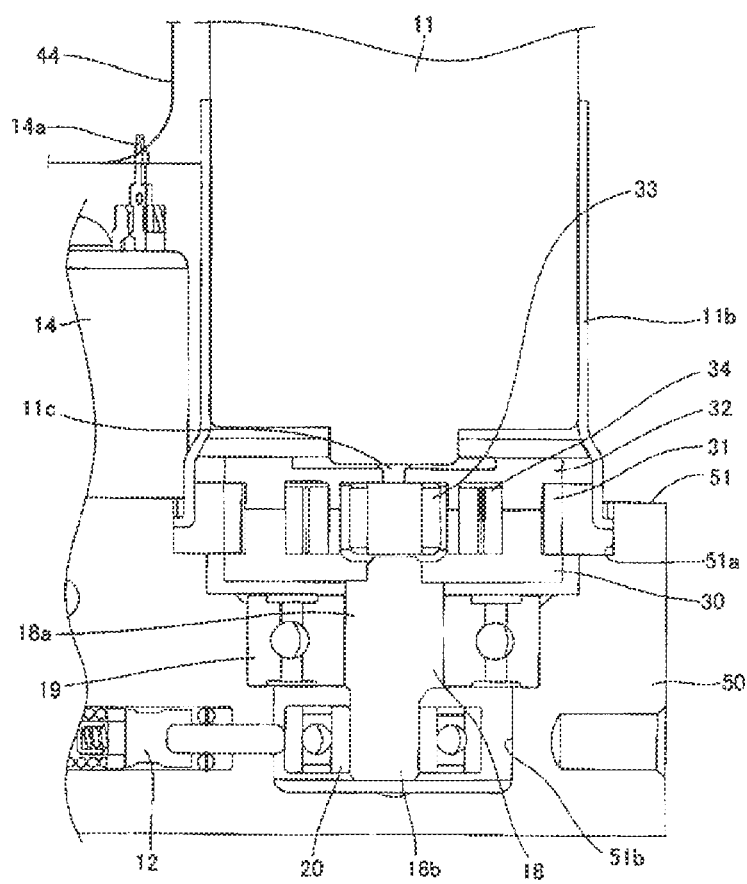
FIG. 6 is a cross-sectional view showing a planetary gear mechanism and an area near the planetary gear mechanism.

FIG. 3 is a perspective view showing the ABS hydraulic unit of one channel, FIG. 4 is a perspective view showing the ABS hydraulic unit of one channel in a state where the housing is removed from the ABS hydraulic unit, FIG. 5 is a side view showing the ABS hydraulic unit in a state where the housing is removed from the ABS hydraulic unit, and FIG. 6 is a cross-sectional view showing a planetary gear mechanism and an area near the planetary gear mechanism.

As shown in FIG. 3, the ABS hydraulic unit 100 of one channel is constituted by combining a housing 42 in which the ECU 40 (see FIG. 2) is housed and a block 50 to each other.

The block 50 is made of aluminum. The block 50 includes the hydraulic circuit 1 (see FIG. 1) in the inside thereof. That is, a pipe passage formed of the first pipe 21 to the fifth pipe 25 though which a brake fluid flows are formed in the block 50. On a pipe connecting surface 52 of the block 50 which is disposed approximately orthogonal to a housing mounting surface 51 (first surface) on which the housing 42 is mounted, the connection end A and the connection end B are formed. The pump 12 and the accumulator 15 (see FIG. 1) are also assembled into the block 50.

The housing 42 is mounted on the housing mounting surface 51 of the block 50, and the housing 42 covers the control circuit board 43, the motor 11, the inlet valve 13 and the outlet valve 14 (see FIG. 4). A connector 45 for electrically connecting the control circuit board 43 to an external device is mounted on the housing 42 in an extending manner in the direction away from the block 50 in a state where the housing 42 is mounted on the block 50. The connector 45 is assembled such that a connector (not shown in the drawing) which is connected to the connector 45 covers the outer periphery of the connector 45.

The housing 42 is formed such that a thickness of a portion 42a of the housing 42 which covers the motor 11 (see FIG. 6) is substantially equal to a thickness of the connector 45 in the z direction indicated by an arrow z. On the other hand, a thickness of a portion 42b of the housing 42 which covers the inlet valve 13 and the outlet valve 14 is set smaller than the thickness of the portion 42a which covers the motor 11 in the z direction toward the block 50.

As shown in FIG. 4, the ABS hydraulic unit 100 is configured such that the motor 11, the inlet valve 13, the outlet valve 14, and the control circuit board 43 are exposed when the housing 42 is removed from the block 50. In the housing mounting surface 51 of the block 50, holes are formed in the direction perpendicular to the housing mounting surface 51, that is, in the z direction. The motor 11, the inlet valve 13 and the outlet valve 14 are assembled into the holes. The inlet valve 13 and the outlet valve 14 are arranged between the motor 11 and the control circuit board 43, and the motor 11, the inlet valve 13 and the outlet valve 14 are assembled approximately perpendicular to the housing mounting surface 51 of the block 50.

The block 50 is formed such that a board opposedly facing surface 54 (second surface) of the block 50 which intersects with the housing mounting surface 51 faces the control circuit board 43 in an opposed manner. In this embodiment, the board opposedly facing surface 54 is formed such that the surface 54 approximately perpendicularly intersects with the housing mounting surface 51 and the pipe connecting surface 52.

The control circuit board 43 on which a CPU, a memory and the like are mounted constitutes the ECU 40, and the control circuit board 43 controls the ABS hydraulic unit 100. The control circuit board 43 has a connector portion 43a which is exposed to the outside in the inside of the connector 45 (see FIG. 3) when the housing 42 is mounted on the block 50. Since the control circuit board 43 has the connector portion 43a, the control circuit board 43 is connected to a connector on a vehicle body side of a motorcycle on which the ABS hydraulic unit 100 is mounted (not shown in the drawing), and the transmission and reception of various information such as a wheel speed are performed between the ABS hydraulic unit and a vehicle body side.

As shown in FIG. 5, the control circuit board 43 is arranged such that the control circuit board 43 extends along the board opposedly facing surface 54 of the block 50, and the inlet valve 13 and the outlet valve 14 (see FIG. 4) are positioned between the control circuit board 43 and the motor 11. The control circuit board 43 is arranged so as to extend along the z direction along which the motor 11, the inlet valve 13, and the outlet valve 14 (see FIG. 4) are assembled to the block 50. That is, the in-plane direction of the control circuit board 43 and the z direction along which the motor 11, the inlet valve 13 and the outlet valve 14 are assembled to the block 50 are set approximately parallel to each other.

The control circuit board 43 is electrically connected to the motor 11, the inlet valve 13, and the outlet valve 14 through a film-like flexible wire 44 having flexibility. Due to such a constitution, the control circuit board 43 can control opening/closing of the inlet valve 13 and the outlet valve 14 by energizing or deenergizing the inlet valve 13 and the outlet valve 14 and can control the rotation of the motor 11. The flexible wire 44 extends so as to pass through top portions of the respective inlet valve 13, outlet valve 14, and motor 11 along the housing mounting surface 51.

The flexible wire 44 is provided in the form of a plurality of combined wires, and is used in common by the motor 11, the inlet valve 13, and the outlet valve 14. The flexible wire 44 has one end thereof fixed to the control circuit board 43 and hence, the flexible wire 44 is electrically connected to the control circuit board 43, while the motor 11, the inlet valve 13 and the outlet valve 14 are electrically connected to the flexible wire 44 respectively in a state where connection terminals 11a, 13a, 14a are inserted into and are engaged with the flexible wire 44.

As shown in FIG. 6, the motor 11 is assembled into a hole 51a formed in the housing mounting surface 51 of the block 50 by way of a motor cover 11b mounted along an outer periphery of the motor 11. A planetary gear mechanism 30 and an eccentric shaft 18 are assembled into the hole 51a. A drive force of the motor 11 drives the eccentric shaft 18 after a rotational speed is decreased by the planetary gear mechanism 30.

The planetary gear mechanism 30 is connected between the motor 11 and the eccentric shaft 18, and includes an inner gear 31, a planetary carrier 32, a sun gear 33, and planetary gears 34.

A rotation stopper is formed on the inner gear 31 and hence, the inner gear 31 is fixed to the block 50 in the inside of the hole 51a so that the inner gear 31 cannot be rotated. The inner gear 31 is formed in a ring shape, and a plurality of teeth are formed on and along an inner peripheral surface of the inner gear 31.

The planetary carrier 32 is formed in a disk shape, and is arranged in the inside of the inner gear 31. In the inside of the planetary carrier 32, three planetary gears 34 are mounted in a rotatable manner. The planetary gears 34 constantly mesh with the teeth formed on and along the inner peripheral surface of the inner gear 31.

On the planetary carrier 32, the sun gear 33 is arranged at the center of three planetary gears 34. In a state where the sun gear 33 is assembled into the planetary carrier 32, the sun gear 33 is brought into a state where the sun gear 33 constantly meshes with three planetary gears 34.

A hole is formed in the planetary carrier 32 in the vicinity of the axis of the planetary carrier 32, an output shaft 11c of the motor 11 extends in the inside of the planetary carrier 32 by passing through such a hole, and the sun gear 33 is assembled to the output shaft 11c of the motor 11. The sun gear 33 is fixedly mounted on the output shaft 11c such that the sun gear 33 is not rotatable relative to the output shaft 11c. That is, the sun gear 33 and the output shaft 11c are configured to be rotated integrally.

A hole is formed in the planetary carrier 32 in the vicinity of the axis of the planetary carrier 32 on an eccentric shaft 18 side, and the eccentric shaft 18 is assembled and fixed to the hole. Due to such a constitution, the eccentric shaft 18 which is assembled to the hole is configured to be rotated integrally with the planetary carrier 32.

The eccentric shaft 18 has one end thereof supported on the planetary gear mechanism 30, and a rotary shaft portion 18a of the eccentric shaft 18 which rotates coaxially with the motor 11 is supported on the block 50 by way of a bearing 19. On the other end of the eccentric shaft 18, a ball bearing 20 is mounted around an eccentric portion 18b of the eccentric shaft 18 which is a shaft disposed eccentric from the rotary shaft of the motor 11 and hence, the eccentric shaft 18 can smoothly transmit a piston action to the pump 12. The eccentric shaft 18 is rotated and transmits a piston action to the pump 12 so that the pump 12 can discharge a brake fluid to the fifth pipe 25 (see FIG. 1) of the hydraulic circuit 1 by moving the piston in a reciprocating manner.

Due to the above mentioned constitution, in the planetary gear mechanism 30, when the sun gear 33 assembled to the output shaft 11c is rotated by a drive force of the motor 11, three planetary gears 34 which mesh with the sun gear 33 are respectively rotated in the direction opposite to the rotating direction of the sun gear 33. Since three planetary gears 34 also mesh with the inner gear 31 respectively, three planetary gears 34 are moved along the inner peripheral surface of the inner gear 31 along with the rotation of the planetary gears 34. At this stage of operation, three planetary gears 34 are moved while being rotated in the inside of the inner gear 31 in the same direction as the rotating direction of the sun gear 33. Since three planetary gears 34 are assembled into the planetary carrier 32, the planetary carrier 32 is moved while being rotated in the inside of the inner gear 31 integrally with three planetary gears 34. Due to such operations, the eccentric shaft 18 which is integrally rotated with the planetary carrier 32 is rotated in the same direction as the rotating direction of the sun gear 33. In the planetary gear mechanism 30 according to this embodiment, a speed reduction rate is set such that a rotational output is outputted from the eccentric shaft 18 with a rotational speed which is approximately ⅕ of a rotational speed of the output shaft 11c of the motor 11, and the output is outputted from the eccentric shaft 18 with a torque which is approximately 5 times larger than a torque of the output shaft 11c of the motor 11. That is, for example, when the motor 11 is rotated at 15000 rpm (rotation per minute), the output shaft 11c is rotated at 3000 rpm, while when the motor 11 is rotated at 20000 rpm, the output shaft 11c is rotated at 4000 rpm. The torque which is 10 N·cm at the output shaft 11c of the motor 11 becomes 50 N·cm at the eccentric shaft 18.

Next, an ABS hydraulic unit of two channels which can perform an antilock brake control with respect to both a front wheel and a rear wheel is explained.

Figure 7:
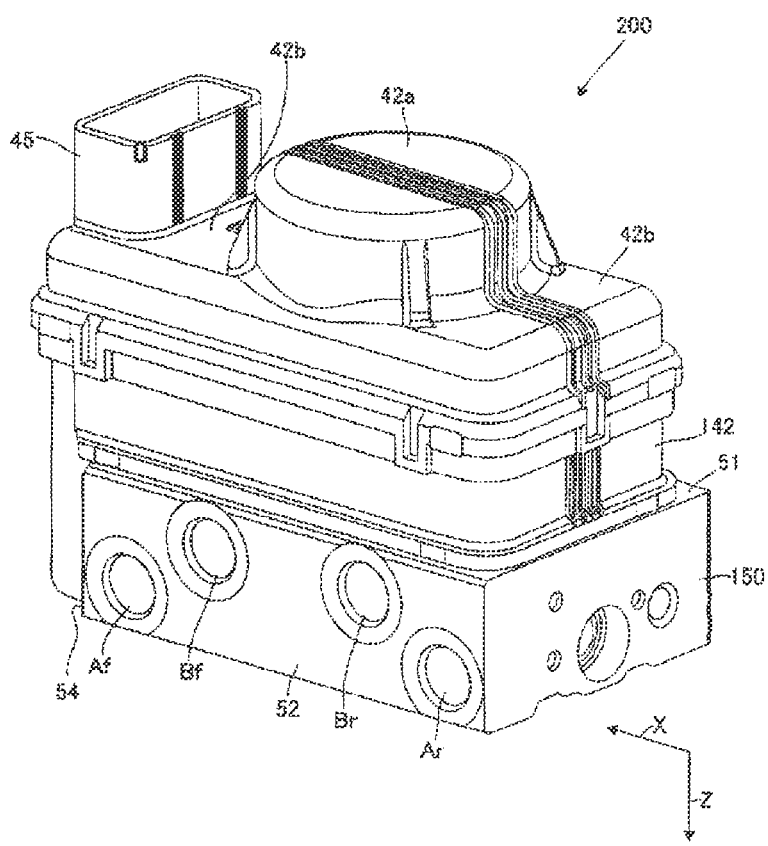
FIG. 7 is a perspective view showing an ABS hydraulic unit of two channels.
Figure 8:
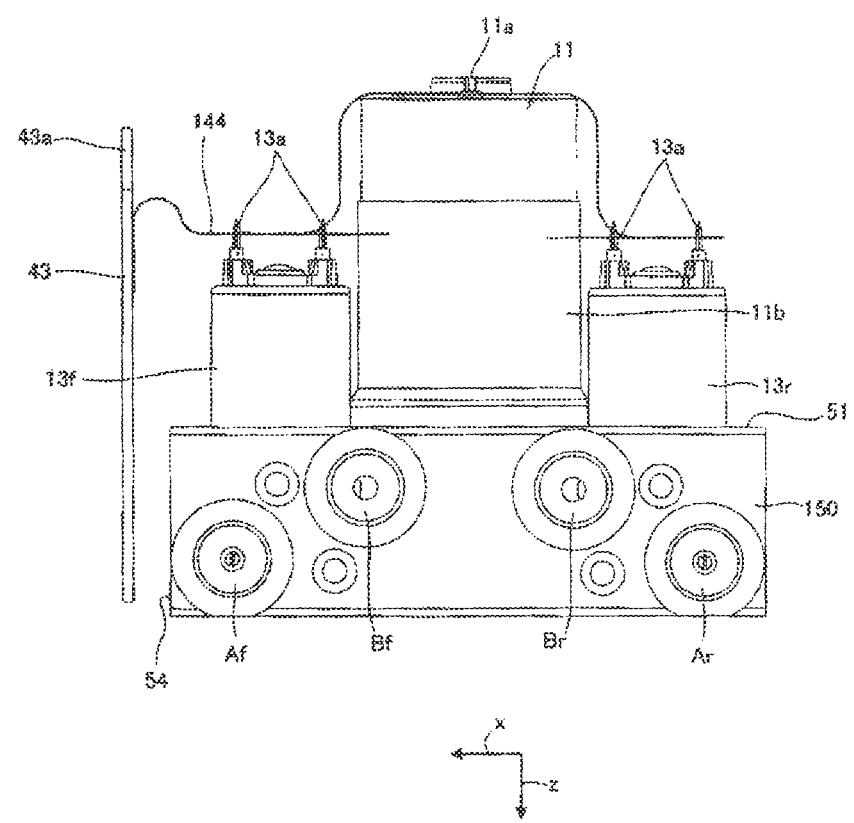
FIG. 8 is a side view showing the ABS hydraulic unit of two channels in a state where the housing is removed from the ABS hydraulic unit.

FIG. 7 is a perspective view showing an ABS hydraulic unit of two channels. FIG. 8 is aside view showing the ABS hydraulic unit of two channels in a state where a housing is removed from the ABS hydraulic unit. The ABS hydraulic unit 200 of two channels differs from the ABS hydraulic unit 100 of one channel which has only one system of the hydraulic circuit 1 with respect to the constitution where the ABS hydraulic unit 200 has two systems of the hydraulic circuits 1, and an ABS control can be performed not only with respect to a front wheel but also with respect to a rear wheel.

As shown in FIG. 7, in the ABS hydraulic unit 200, a connection end Af which is connected to a front-wheel-side master cylinder 2, a connection end Bf which is connected to a front-wheel-side wheel cylinder 5, a connection end Ar which is connected to a rear-wheel-side master cylinder 2, and a connection end Br which is connected to a rear-wheel-side wheel cylinder 5 are formed on a pipe connecting surface 52.

Corresponding to such a constitution, a block 150 is formed in a more elongated manner in the x direction than the block 50 of the ABS hydraulic unit 100 of one channel, and a housing 42 is configured such that a portion 42b of the housing 42 which covers an inlet valve 13f and an outlet valve 14f (see FIG. 8) on a front wheel side and a portion 42b of the housing 42 which covers an inlet valve 13r (second valve) and an outlet valve 14r (second valve) on a rear wheel side (see FIG. 8) are arranged with a portion 42a of the housing 42 which covers a pump 12 sandwiched therebetween.

As shown in FIG. 8, the ABS hydraulic unit 200 is configured such that the inlet valve 13f and the outlet valve 14f on a front wheel side and the inlet valve 13r and the outlet valve 14r on a rear wheel side are arranged in plane symmetry with respect to the pump 12. That is, the inlet valve 13r and the outlet valve 14r are assembled into the housing mounting surface 51 such that the motor 11 is positioned between the inlet valve 13r, the outlet valve 14r and the control circuit board 10. The pump 10, the motor 11, a planetary gear mechanism 30 and the like are used in common by the hydraulic circuit 1 on a front wheel side and the hydraulic circuit 1 on a rear wheel side.

The block 150 is formed such that the board oppositely facing surface 54 which intersects with the housing mounting surface 51 into which the motor 11, the inlet valve 13f and the outlet valve 14f on a front wheel side and the inlet valve 13r and the outlet valve 14r on a rear wheel side are assembled faces the control circuit board 43 in an opposed manner. The board oppositely facing surface 54 of the ABS hydraulic unit 200 of two channels according to this embodiment is, in the same manner as the ABS hydraulic unit 100 of one channel, formed approximately perpendicular to the housing mounting surface 51 and the pipe connecting surface 52.

The control circuit board 43 extends along the board oppositely facing surface 54 of the block 150, and is arranged such that the inlet valve 13f and the outlet valve 14f are positioned between the control circuit board 43 and the motor 11.

The control circuit board 43 and a flexible wire 144 are used in common by the hydraulic circuit 1 on a front wheel side and the hydraulic circuit 1 on a rear wheel side. That is, the flexible wire 144 is provided in the form of a plurality of combined wires, and is used in common by the motor 11, the inlet valves 13f, 13r, and the outlet valves 14f, 14r.

The flexible wire 144 which is connected to the control circuit board 43 is connected to connection terminals 13a, 14a of the front-wheel-side inlet valve 13f and outlet valve 14f, a connection terminal 11a of the motor 11, and connection terminals 13a, 14a of the rear-wheel-side inlet valve 13r and outlet valve 14r in this order. In this embodiment, the control circuit board 43 is arranged adjacent to the inlet valve 13f and outlet valve 14f on a front wheel side. However, the control circuit board 43 may be arranged adjacent to the inlet valve 13r and outlet valve 14r on a rear wheel side.

In this embodiment, the control circuit board 43 extends along the board oppositely facing surface 54, is arranged such that the inlet valves 13, 13f and the outlet valves 14, 14f are positioned between the control circuit board 43 and the motor 11, and is electrically connected to the motor 11, the inlet valves 13, 13f, 13r and the outlet valves 14, 14f, 14r via the flexible wires 44, 144 which extend along the housing mounting surface 51. Due to such a constitution, a size of the control circuit board 43 in the ABS hydraulic unit 100 of one channel and a size of the control circuit board 43 in the ABS hydraulic unit 200 of two channels can be set equal to each other. Accordingly, it is unnecessary to change a size of the control circuit board 43 corresponding to a size of the block 50, 150 so that the control circuit board 43 can be used in common.

Although the invention has been explained based on the embodiments heretofore, the invention is not limited to the embodiments. For example, in the embodiment, the ABS hydraulic unit 100 of one channel is configured to perform an ABS control only with respect to the front wheel. However, the invention is not limited to such an embodiment. For example, an ABS control may be performed with respect to only a rear wheel by connecting the ABS hydraulic unit 100 to a master cylinder of a brake pedal and a wheel cylinder of the rear wheel.

REFERENCE SIGNS LIST

1: hydraulic circuit
2: master cylinder
3: brake lever
4: reservoir
5: wheel cylinder
6: brake caliper (hydraulic brake)
11: motor
11a: connection terminal
11b: motor cover
11c: output shaft
12: pump
13: inlet valve (valve)
13a: connection terminal
13f, 13r: inlet valve (second valve)
14: outlet valve (valve)
14a: connection terminal
14f, 14r: outlet valve (second valve)

15: accumulator
17: check valve
18: eccentric shaft
18a: rotary shaft portion
18b: eccentric portion
19: bearing
20: ball bearing
21: first pipe
22: second pipe
23: third pipe
24: fourth pipe
25: fifth pipe
30: planetary gear mechanism
31: inner gear
32: planetary carrier
33: sun gear
34: planetary gear
40: ECU
41f: speed sensor
41r: speed sensor
42: housing
42a: portion which cover pump
42b: portion which cover valve
43: control circuit board
43a: connector portion
44: flexible wire
45: connector
50: block
51: housing mounting surface (first surface)
51a: hole
51b: space
52: pipe connecting surface
54: surface opposedly facing a circuit board (second surface)
100: ABS hydraulic unit
150: block
200: ABS hydraulic unit

What is claimed is:

1. An ABS hydraulic unit for performing an antilock brake control of a hydraulic brake, the ABS hydraulic unit comprising:
a pump and a valve, wherein the pump and the valve form a portion of a hydraulic circuit for making the hydraulic brake perform braking;
a motor for operating the pump;
a block into which the pump, the valve and the motor are assembled; and
a control circuit board for controlling the motor and the valve, wherein
the block has a first surface into which the motor and the valve are assembled, and a second surface which intersects with the first surface, and
the control circuit board is arranged such that the control circuit board extends away from the block in a direction substantially parallel to the second surface and the valve is positioned between the control circuit board and the motor, the control circuit board being electrically connected with the motor and the valve through a wire extending from the control circuit board to both a connection terminal on the valve and to a connection terminal on the motor.

2. The ABS hydraulic unit according to claim 1, wherein the block has a second hydraulic circuit which differs from the above-mentioned hydraulic circuit, and a second valve mounted in the second hydraulic circuit is assembled into the first surface such that the motor is positioned between the second valve and the control circuit board.

3. The ABS hydraulic unit according to claim 2, wherein the wire is provided in the form of a plurality of combined wires, and the wire is used in common by the motor and the valve.

4. The ABS hydraulic unit according to claim 3, wherein the wire is provided in the form of a plurality of combined wires, and the wire is used in common by the valve and the second valve.

5. The ABS hydraulic unit according to claim 4, wherein the wire is a flexible wire.

6. The ABS hydraulic unit according to claim 5, wherein the motor is configured to operate the pump by way of a planetary gear mechanism.

7. The ABS hydraulic unit according to claim 2, wherein the wire extends from the circuit board to the connection terminal on the valve, then to the connection terminal on the motor, then to a connection terminal on the second valve.

8. The ABS hydraulic unit according to claim 1, wherein the wire is provided in the form of a plurality of combined wires.

9. The ABS hydraulic unit according to claim 2, wherein the wire is provided in the form of a plurality of combined wires, and the wire is used in common by the valve and the second valve.

10. The ABS hydraulic unit according to claim 1, wherein the wire is a flexible wire.

11. The ABS hydraulic unit according to claim 1, wherein the motor is configured to operate the pump by way of a planetary gear mechanism.

12. The ABS hydraulic unit according to claim 1, wherein at least a portion of the wire extends substantially parallel to the first surface.

13. The ABS hydraulic unit according to claim 1, further comprising a housing that covers at least a portion of the control circuit board.

14. The ABS hydraulic unit according to claim 13, wherein the control circuit board includes a connector portion, wherein a connector is mounted on the housing, and wherein the connector portion is disposed within the connector.

15. The ABS hydraulic unit according to claim 13, wherein the housing includes a first thickness in a region that covers the valve, and a second, different thickness in a region that covers the motor.

16. The ABS hydraulic unit according to claim 1, wherein the block includes a third surface that is perpendicular to the first and second surfaces, wherein the third surface includes connections for pipes of the hydraulic circuit.

17. The ABS hydraulic unit according to claim 1, wherein the valve is positioned between the circuit board and the motor.

18. The ABS hydraulic unit according to claim 1, wherein the circuit board is coupled directly to the second surface of the block.

19. The ABS hydraulic unit according to claim 1, wherein the connection terminal on the valve is positioned at a top end of the valve, the top end of the valve spaced opposite the first surface of the block, and the connection terminal of the motor is positioned at a top end of the motor, the top end of the motor spaced opposite the first surface of the block.

* * * * *